United States Patent

Sollman et al.

[15] 3,671,960

[45] June 20, 1972

[54] FOUR PHASE ENCODER SYSTEM FOR THREE FREQUENCY MODULATION

[72] Inventors: George H. Sollman, Cambridge; Samuel J. Dixon, Holliston, both of Mass.

[73] Assignee: Honeywell Inc., Minneapolis, Minn.

[22] Filed: July 6, 1970

[21] Appl. No.: 52,313

[52] U.S. Cl. ..........340/347 DD, 325/38, 178/66

[51] Int. Cl. ..........H04l 3/00

[58] Field of Search ..........340/347 DD, 174.1 G, 174.1 H; 178/66, 67, 68; 325/38; 328/55, 63

[56] References Cited

UNITED STATES PATENTS 3,422,425 1/1969 Vallee..........340/347 DD
3,414,894 12/1968 Jacoby..........340/347 DD
3,500,385 3/1970 Padalino et al..........340/347 DD

*Primary Examiner*—Maynard R. Wilbur
*Assistant Examiner*—Jeremiah Glassman
*Attorney*—Fred Jacob and Leo Stanger

[57] ABSTRACT

A multiphase encoder translates the bits of a Non-Return-to-Zero digital signal into a three frequency self-clocking signal characterized by having a data transition at the center of a binary ONE bit and a data transition between successive binary ZERO bits.

18 Claims, 3 Drawing Figures

INVENTORS
GEORGE H. SOLLMAN
SAMUEL J. DIXON
BY Faith F. Driscoll
ATTORNEY

INVENTORS
GEORGE H. SOLLMAN
SAMUEL J. DIXON
BY Faith F. Driscoll
ATTORNEY

FOUR PHASE ENCODER SYSTEM FOR THREE FREQUENCY MODULATION

RELATED APPLICATIONS

"An Improved Two Phase Encoder System for Three Frequency Modulation" invented by George H. Sollman filed on even date with this application, Ser. No. 52,327, and assigned to the same assignee named herein.

"A Two Phase Encoder System for Three Frequency Modulation" invented by George H. Sollman and Samuel J. Dixon filed on even date with this application, Ser. No. 52,328, and assigned to the same assignee named herein.

BACKGROUND OF THE INVENTION

1. Field of the Invention

This invention relates to digital encoding systems and more particularly, to encoding systems for use in magnetic recordings.

2. Discussion of Prior Art

Numerous encoding schemes have been developed for recording digital information on a magnetic medium at high densities. One such scheme involves an encoding technique which introduces few transitions in the context of the information involved.

In greater detail, the technique never introduces any more than one transition per information bit and at least a transition once every two information bits. The rules for this encoding are:

1. a flux reversal is made to occur in the center of every bit cell (i.e. time interval defining a bit) containing a binary ONE and, 2. a flux reversal is made to occur between two adjacent bit cells containing binary ZEROS.

Because of the characteristics of the self-clocking waveform (i.e. three different time periods) which result from applying the above rules of encoding, this waveform is termed a three frequency encoded waveform herein.

Prior art encoder systems in general implement the above mentioned encoding rules with delay devices in the form of monostable multivibrators, delay lines, RC timing circuits, etc. While these delay devices reduce the number of storage devices required in some systems, such devices are frequency sensitive. Hence, one disadvantage of these prior art systems is that the timing accuracy of the encoder can vary with changes in frequency and temperature. This in turn creates problems in bit shift.

Another disadvantage of some other prior art systems is that these systems use a variety of different types of storage devices and logic gates. This normally results in increases in cost, logic, and nonuniformity. Moreover, these systems are not easily manufactured in integrated circuit form.

OBJECTS

Accordingly, it is an object of this invention to provide an improved encoder system which generates a three frequency self-clocking waveform without the use of frequency sensitive devices;

It is a more specific object of this invention to provide an encoder system which employs a minimum number of storage devices and a multiphase clock for accurate generation of logic functions without measurable bit shift;

It is a still more specific object of this invention to provide an encoder which is well suited for integrated circuit construction.

SUMMARY OF THE INVENTION

The above and other objects are provided according to the basic concept of this invention through a four phase encoder logic arrangement. The arrangement includes a four phase clock in combination with a single clocked flip-flop in series with a complementing output flip-flop.

In greater detail, the clock source operates at 4N bits/sec. to synchronize it with an input bit data stream of N bits/sec. The clock in the illustrated embodiment includes a plurality of flip-flops series connected to form a shift register arrangement. The outputs of the register are combined with the clock source input to produce four phase outputs. A first of the phase outputs clocks the bits of the data stream waveform from a word data register into the encoder system. This establishes a desired phase relationship between each of the phase outputs and the bit times of the data waveform. Another phase output switches the clocked flip-flop in response to the bits so as to delay each bit by less than one bit time.

Logic gates combine the input data stream waveform and the clocked flip-flop first by gating the data stream waveform and phase used to clock the flip-flop so as to produce pulses representative of binary ONES. The complement of the data stream waveform and the inversion of the flip-flop output are gated with another phase occurring intermediate the other phase outputs to produce pulses representative of binary ZEROS. The binary ONES and ZEROS are then gated to the output flip-flop which complements to produce the self-clocking three frequency encoded waveform.

The above and other objects of this invention are achieved in an illustrative embodiment described hereinafter. All features which are believed to be characteristic of the invention, both as to its organization and method of operation together with further objects and advantages thereof will be better understood from the following description considered in connection with the accompanying drawings. It is to be expressly understood, however, these drawings are for the purpose of illustration and description only and are not intended as a definition of the limits of the invention.

DESCRIPTION OF THE PREFERRED EMBODIMENT

Figure 1:
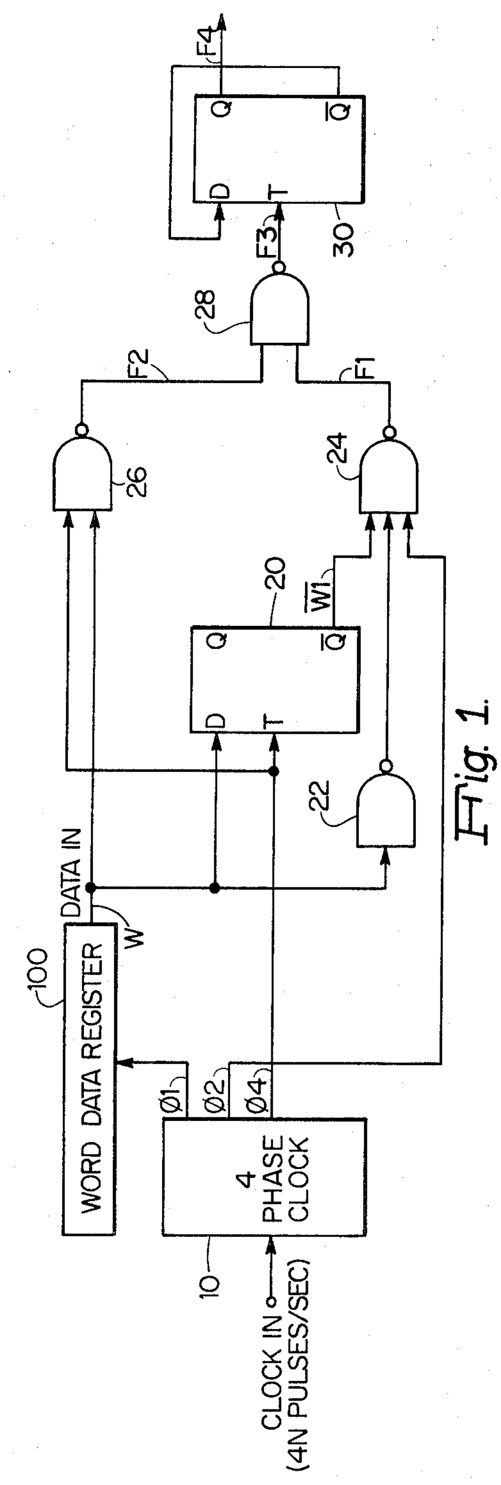
FIG. 1 shows in block diagram form the encoder system of this invention.
Figure 1A:
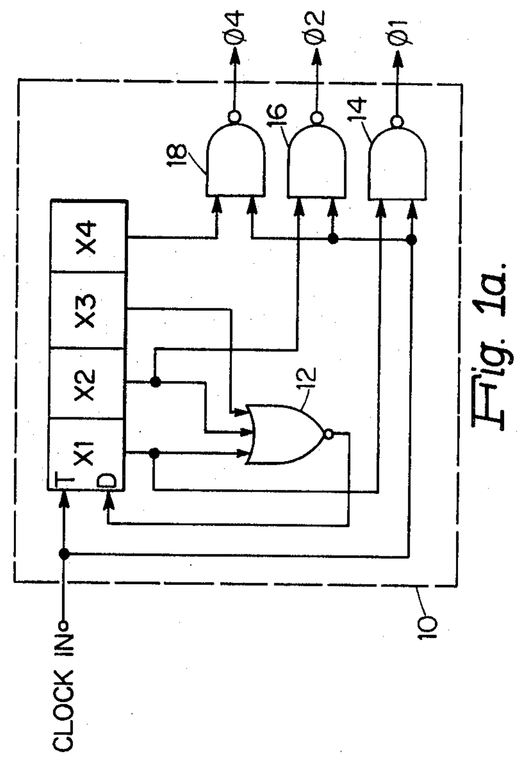
FIG. 1*a* shows in greater detail, a preferred embodiment of the four phase clock of FIG. 1; and, FIG. 2 is a timing diagram showing a series of waveforms illustrating the relationship of signals in different portions of the encoder system of FIG. 1.

As illustrated in FIG. 1, the encoder system includes a four phase clock 10 operative to produce first, second, third, and fourth sequential phase outputs $\phi 1$, $\phi 2$, $\phi 3$, and $\phi 4$. However, only $\phi 1$, $\phi 2$, and $\phi 4$ outputs are required. Therefore, a gate for a $\phi 3$ output has been eliminated as shown by FIG. 1*a*.

The phase output $\phi 1$ connects as a clock input to a clocked word data register 100 which provides temporary data storage for the information bits of the input data stream waveform to be encoded.

The $\phi 4$ output connects to the CLOCK input, T, of flip-flop 20 to clock the information bit output, W, applied to a DATA input, D, of flip-flop 20.

For the purposes of the present invention, a clocked flip-flop may be defined as one having two states at least a single DATA input, a CLOCK input, and complementary outputs. These outputs are designed as Q, and $\overline{Q}$.

An example of a clocked flip-flop is the so-called D flip-flop which is described at page 126 of the text "Logical Design of Digital Computers" by M. Phister Jr., published in 1958 by John Wiley & Sons, Inc.

It will be noted that other flip-flops such as the RST and JK can be made to operate in a similar fashion. For example, an RST flip-flop can be changed into a D flip-flop by adding a NAND gate to the SET (S) input of the RST flip-flop and then tying the NAND gate input to the R input. Similarly, an equivalent change can be made to a JK flip-flop which converts it into a D flip-flop.

The logic signal presented to the DATA input, D, appears at the Q output after the occurrence of the clocking transition less than one bit interval later. In the arrangement shown, flip-flop 20 switches on the trailing edge (i.e. negative-going edge) of the $\phi4$ pulses and produces an output $\overline{W1}$ at its $\overline{Q}$ output three quarters of a bit interval later.

The data stream waveform, W, is fed to gate 22 which in the illustrated embodiment is symbolically shown as a NAND gate. As well known in the art, the NAND gate produces an inverted AND function. Here, it has a single input and functions as an inverter. It will be noted that both inputs of the NAND gate may be connected together, or the unused input tied to a voltage representative of a binary ONE.

The output of NAND gate 22 feeds a further NAND gate 24 which also receives the delayed inversion of the input data stream waveform W designated as $\overline{W1}$ in addition to the inversion of data stream waveform W and the $\phi2$ output. The NAND gate 24 produces an output F1 in accordance with the Boolean expression:

$$F1=(\overline{\overline{W}\cdot\overline{W1}\cdot\phi2}) \qquad (1)$$

It will be appreciated that this expression as others herein assume that a binary ONE is defined as a high or positive voltage level and a binary ZERO is defined as ground or as a low voltage level.

The data stream waveform W is also fed to a NAND gate 26 which also receives $\phi4$ pulses. The NAND gate 26 produces as an output F2 in accordance with the Boolean expression:

$$F2=\overline{W\cdot\phi4} \qquad (2)$$

A further NAND gate 28 feeds the outputs F1 and F2 to a further complementing flip-flop 30. This flip-flop, as shown, can be a D flip-flop connected as shown to complement. The self-clocking three frequency output, F4, is then fed to a driver circuit (not shown).

The clock 10 includes four flip-flops X1, X2, X3, and X4 connected in series to form a shift register. These flip-flops may also be of the D type. A generator (not shown) applies clock pulses along a line CLOCK IN to the CLOCK input of each of the flip-flops for shifting signals therethrough. While any type of generator may be used, depending upon the accuracy required in a given system, a crystal oscillator may be preferred since such oscillation are relatively inexpensive and extremely accurate.

The binary ONE outputs of the first three flip-flops are recirculated through a gate 12 to the data input of the first flip-flop X1 so as to inhibit the input of binary ONES into the shift register until the first three flip-flops are in a binary ZERO state. At that time, a next clock pulse causes the first flip-flop, X1, to be switched to its binary ONE state.

The gate 12 which performs the above inhibit function is illustrated symbolically as a NOR gate. This gate is enabled in accordance with the Boolean expression:

$$F=\overline{X1}\cdot\overline{X2}\cdot\overline{X3} \qquad (3)$$

Additionally, each of the binary ONE outputs of the flip-flops X1, X2, and X4 are gated with a clock pulse by gates 14, 16, and 18. These gates are also symbolically shown as NAND gates. When these gates are conditioned by the outputs of flip-flops X1, X2, and X4 together with clock pulses, they produce $\phi1$, $\phi2$, and $\phi4$ pulses having the 90° phase relationships illustrated in FIG. 2.

It will be obvious to those skilled in the art that other equivalent gating arrangements may be substituted for certain ones of the gates shown. However, this may be done only with attendant increases in the number of gates required.

DESCRIPTION OF OPERATION

Figure 2:
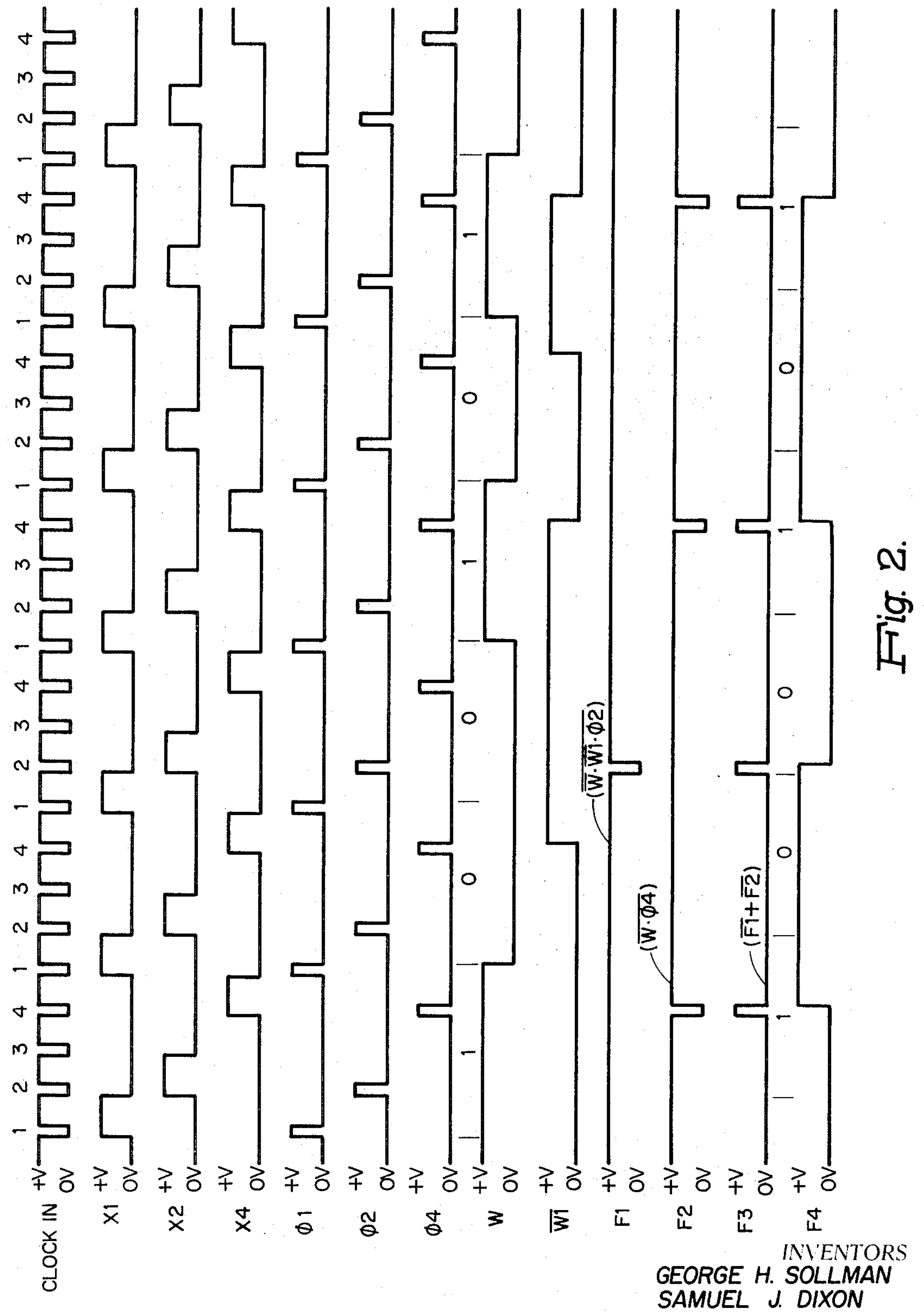

With reference to FIGS. 1 and 2, the operation of the encoder system of FIG. 1 will now be described.

First, referring to FIGS. 1*a* and 2, the four phase clock 10 receives the pulses via the line CLOCK IN. Specifically, assuming all the flip-flops are in their reset state, a first clock pulse switches the first flip-flop X1 to its binary ONE state. The reason is that since the inputs to NOR gate 12 are all initially ZEROS, NOR gate 12 applies a voltage level representative of a binary ONE to the DATA input D of flip-flop X1 which causes it to switch to its ONE state upon the arrival of the first clock pulse.

Successive clock pulses cause the binary ONE to be shifted serially through flip-flops X2, X3, and X4. This is illustrated by waveforms X1, X2, and X4 of FIG. 2. Accordingly, when the NAND gates 14, 16 and 18 gate the outputs of flip-flops X1, X2, and X4 with clock pulses applied to line CLOCK IN, these gates produce the $\phi1$, $\phi2$, and $\phi4$ pulses having the relationship illustrated by the $\phi1$, $\phi2$, and $\phi4$ waveforms of FIG. 2.

While FIG. 2 illustrates that the flip-flops are clocked at the leading edge (i.e. positive going transition) of the clock pulses, it will be appreciated that these flip-flops may also be clocked on the trailing edge as well. As mentioned, these flip-flops may be of the D type or the equivalent thereof.

Now, in FIG. 2, the bits of the data stream waveform, W, are shifted out of the data register 100 by applying $\phi1$ pulses thereto. This waveform is then clocked by $\phi4$ pulses into flip-flop 20. This non-return-to-zero (NRZ) waveform is coded to represent the binary information 100101.

As shown in FIG. 2, the pulses of $\phi1$ phase output are such that the leading edges (i.e. positive going transitions) occur at the boundaries or bit intervals of the information bits. The pulses of the $\phi2$ and $\phi4$ phase outputs respectively occur within the information bit interval at one quarter and at three quarters of a bit interval.

The $\phi4$ pulses applied to the CLOCK input, T, condition flip-flop 20 to delay each of the information bits by three quarters of a bit interval as shown by waveform $\overline{W1}$. When the NRZ waveform has a binary ONE bit, NAND gate 24 is enabled by the data stream waveform W to pass $\phi4$ pulses to the clock input T of complementing flip-flop 30 via NAND gate 28. This is illustrated by waveform F2 of FIG. 2.

When the NRZ waveform has two successive binary ZERO bits, NAND gate 24 is enabled by the $\overline{W1}$ output of flip-flop 20 and inverted version of waveform W to pass $\phi2$ pulses through NAND gate 28 to he clock input T of flip-flop 30.

The NAND gate 28, as illustrated by waveform F3, conditions flip-flop 30 to change state or complement by applying the outputs F1 and F2 of NAND gates 24 and 26 in turn producing the self-clocking three frequency signal corresponding to waveform F4. Flip-flop 30 as illustrated by waveform F4 switches state at the trailing edge of the pulses supplied by gates 24 and 26. However, flip-flop 30 can also be arranged to switch state on the leading edge (i.e. positive going transition) of each pulse.

The "ONE" transitions occur at the centers of the bit intervals for each ONE bit in the input waveform W. The "ZERO" transitions only occur at the boundary between two successive binary ZEROS in the input waveform W. Hence, the output waveform is coded so that a transition at the center of a bit time represents a binary ONE and the absence of a transition at the center represents a binary ZERO. As mentioned previously, the waveform F4 is well suited for recording digital information on a magnetic medium at high densities.

An improved four phase encoder system has been disclosed which utilizes a minimum number of flip-flops and gates. Since in the illustrated embodiment the same type of gates and flip-flops can be used in almost the entire system, the encoder system is easily implemented at low cost using integrated circuits. For example, each of the flip-flops and gates may be implemented using MOS logic such as described in an article titled "MOS Complex Array System Design" by L. L. Boysel and G. P. Carter appearing in the February, 1969 issue of a publication titled "Electro-Technology."

Furthermore, because each of the encoder flip-flops are clocked by multiphase signals, the encoder system can accurately generate the requisite waveforms.

It will be appreciated that change can be made to the illustrated embodiment without departing from the invention. For example, equivalent gates can be used in place of NAND gates. Further, equivalent types of flip-flops may be also substituted for D flip-flops. For this purpose, the text by Phister mentioned previously may be consulted.

While in accordance with the provisions and statutes, there has been illustrated and described the best form of the invention known, certain changes may be made in the circuits described without departing from the spirit of the invention as set forth in the appended claims and that in some cases, certain features of the invention may be used to advantage without a corresponding use of other features.

Having described the invention, what is claimed as new and novel for which it is desired to secure Letters Patent is:

1. An improved encoder for translating an input NRZ data waveform into a self-clocking three frequency waveform using a first phase signal having pulses which occur only at the boundaries of the bit intervals of said data waveform and second and third phase signals each having pulses which occur only at successive predetermined times within said bit intervals, said encoder comprising:

a clocked bistable storage device, including a CLOCK input for receiving said third phase signal and a DATA input for receiving said input NRZ waveform, said storage device being conditioned by the pulses of said third phase signal to produce a pair of complementary data signals, each being delayed by a portion of one bit interval to said input NRZ waveform;

a first gate connected to receive a predetermined one of said complementary data signals, the complement of said NRZ waveform and the pulses of said second phase signal, said first gate being enabled to pass pulses of said second phase signal when said predetermined one of the data signals and said complement of NRZ waveform are in the same state representative of successive binary ZERO bits in said input NRZ waveform;

a second gate connected to receive said NRZ waveform and said third phase signal, said second gate being enabled to pass pulses of said third phase signal when said NRZ waveform is in a state representative of a binary ONE bit in said NRZ waveform;

a third gate connected to receive the pulse outputs of said first and second gate; and, a complementing output flip-flop connected to said third gate and being conditioned by said pulses to produce said three frequency waveform in which transitions occur at the center of a binary ONE bit and between successive binary ZERO bits.

2. The encoder of claim 1 wherein the pulses of said second and third phase signals occur respectively at one quarter and three quarters of said bit interval.

3. The encoder of claim 1 wherein said flip-flops are of the D type.

4. The encoder of claim 1 wherein said all of said gates are NAND gates.

5. An encoder for translating bits of a NRZ data input signal into a self-clocking waveform comprising:

a multiphase clock for generating pulses of a plurality of phases, said plurality including a succession of at least first, second, and third phase waveforms having predetermined phase relationships to one another;

means for synchronizing the clocking of said NRZ signal with said first phase waveform of said clock so that the pulses of said first phase waveform occur at the boundaries between successive bit intervals of said NRZ signal and the pulses of the other of said phase waveforms occur within said bit intervals;

a clocked flip-flop having a CLOCK input connected to receive said third phase waveform and a DATA input to receive said NRZ signal, said flip-flop being conditioned by the pulses of said third phase waveform to produce a data signal and the complement of said data signal by delaying said NRZ signal a portion of said bit interval;

first gating means coupled to said clocked flip-flop for receiving said complement of said data signal, said NRZ signal and the pulses of said third phase waveform, said first gating means being conditioned to pass pulses of said third phase waveform when said data signal and said NRZ signal are in a first state representative of the occurrence of successive binary ZERO bits in said NRZ signal;

second gating means connected to receive pulses of said second phase waveform and said NRZ signal, said second gating means being conditioned to pass pulses of said third phase waveform when said NRZ signal is in a state representative of said bits being binary ONES;

third gating means coupled to said first and second gating means for receiving pulses of said second and third phase waveforms; and a complementing output flip-flop coupled to said third gating means and being conditioned by said pulses of said second and third phase waveforms to produce said self-clocking waveform in which transitions occur at the center of a binary ONE bit and between successive binary ZERO bits.

6. The encoder of claim 5 wherein said flip-flops are of the D type and said pulses of said second and third phase waveforms respectively occur at a time corresponding to one quarter and three quarters of said bit interval.

7. The encoder of claim 5 wherein said gates are NAND gates.

8. The encoder of claim 5 wherein said multiphase clock includes a plurality of flip-flops connected in series to form a shift register, gating means for connecting the outputs of a predetermined number of said flip-flops to form a recirculating input to said shift register, said clock further including a set of gating means having a plurality of gates corresponding in number to said phases and being connected to predetermined ones of said flip-flops for deriving pulses of said first, second and third phases.

9. The encoder of claim 5 wherein said synchronizing means includes a data shift register connected to have its contents shifted by pulses of said first one of said phases to establish said predetermined phase relationship between said bits and the pulses of said first, second, and third phases.

10. The encoder of claim 8 wherein said flip-flops are of the D type.

11. The encoder of claim 8 wherein said gating means includes a NOR gate and said plurality of gates are NAND gates.

12. An encoder for translating bits of a data stream waveform, W, into a three frequency self-clocking waveform comprising:

a four phase clock generator for generating pulses of at least first, second, and third phases ($\phi 1$), ($\phi 2$), and ($\phi 4$) in response to a clock input signal so as to have said ($\phi 1$) pulses coincide with the boundaries of said bits and said ($\phi 2$) and ($\phi 4$) pulses each coincide with different predetermined portions of said bits;

a clocked bistable device including a CLOCK input for receiving said ($\phi 4$) pulses and a DATA input for receiving said data stream waveform, (W), said bistable device being conditioned to be switched by said ($\phi 4$) pulses to produce a data signal, (W1) and its complement ($\overline{W1}$), each delayed by a portion of a bit interval to said waveform (W);

a first gate for receiving the complement of said data waveform (W), said complement ($\overline{W1}$) and said ($\phi 2$) pulses, said gate being enabled to produce a pulse output (F1) in accordance with the expression: ($F1 = \overline{W\cdot\overline{W1}}\cdot\phi 2$);

a second gate for receiving said data waveform (W) and said ($\phi 4$) pulses, said gate being enabled to produce a pulse output (F2) as defined by the relationship: ($F2 = \overline{W\cdot\phi 4}$; and, a complementing output bistable device including a gate connected to receive said outputs (F1) and (F2), said gate being enabled to produce an output (F3) in accordance with the relationship: ($F3 = \overline{F1}+\overline{F2}$) for conditioning said bistable device to switch state during a bit interval when there is a binary ONE and between bit intervals when there are two successive binary ZEROS in said data stream waveform.

13. The encoder of claim 12 wherein said storage devices are D type flip-flops and said gates are NAND gates.

14. The encoder of claim 12 further including a data shift register connected to receive said ($\phi 1$) pulses and being conditioned thereby to apply the bits of said data stream waveform to said DATA input so as to establish said coincidences between each of said pulses and said bits.

15. The encoder of claim 12 wherein said four phase clock includes a plurality of flip-flops (X1), (X2), (X3), and (X4) connected in series to form a shift register, each of said flip-flops having a CLOCK input and a DATA input, a gate connected to receive outputs of said flip-flops (X1), (X2), and (X4) and to apply an output (F) to the DATA input of said flip-flop (X1), said gate being enabled to produce said (F) output in accordance with the relationship: ($F = \overline{X1} \cdot \overline{X2} \cdot \overline{X3}$), said clock further including a set of gates, each being connected to a different one of said flip-flops (X1), (X2), and (X4) and to receive said clock input signal for deriving said ($\phi 1$), ($\phi 2$), and ($\phi 4$) pulses.

16. The encoder of claim 15 wherein $\phi 2$ and $\phi 4$ pulses occur respectively at one quarter and three quarters of said bit intervals.

17. The encoder of claim 15 wherein said flip-flops are of the D type.

18. The encoder of claim 15 wherein said gate is a NOR gate and said set of gates are NAND gates.

* * * * *